G. SLATTER.
LAWN MOWER.
APPLICATION FILED AUG. 13, 1908.
965,031.
Patented July 19, 1910.
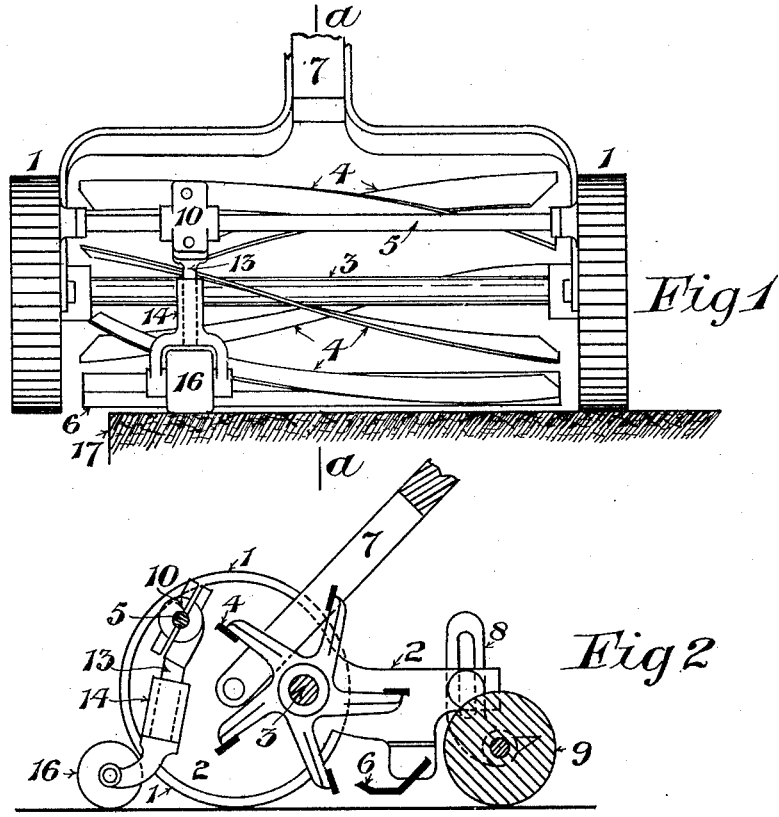
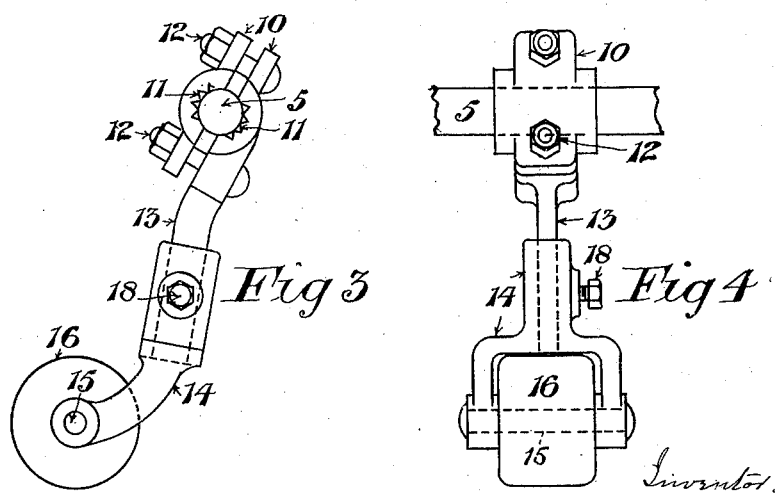

UNITED STATES PATENT OFFICE.

GEORGE SLATTER, OF PLUMTREE, ENGLAND.

LAWN-MOWER.

965,031.  Specification of Letters Patent.  Patented July 19, 1910.

Application filed August 13, 1908. Serial No. 448,416.

*To all whom it may concern:*

Be it known that I, GEORGE SLATTER, a subject of the King of Great Britain, residing at Plumtree, in the county of Nottingham, England, have invented new and useful Improvements in Lawn-Mowers, of which the following is a specification.

This invention relates to improvements in lawn mowers provided with a rotating cutter which is driven by gear wheels at one or both sides of the lawn mower and in which the height of the cutter above the surface of the lawn is regulated by means of a back roller. In this class of machine, as usually constructed, the side frames are connected together at the front by a tie rod and at the back by the fixed cutter and the handle. The frames also carry the bearings for the cutter shaft and for the back roller, and when the lawn mower is in use the revolving cutter is held parallel with the surface of the lawn by means of the back roller and the side driving wheels. When however it is desired to cut the edge of a lawn one of the side driving wheels overhangs such edge and the cutter is then liable to dig into the lawn.

The present invention has for its object the combination with a lawn mower of the side driven type of a front supporting roller which will allow of the lawn mower being used for cutting the edge of the lawn by supporting the cutter when one of the driving wheels overhangs the edge of the lawn, also the provision of means whereby such roller, and the bracket carrying the same, can be applied to lawn mowers of different sizes.

In the accompanying drawings: Figure 1 is a front elevation of a side driven lawn mower showing the application thereto of a front supporting roller. Fig. 2 is a section on the line *a. a.* Fig. 1. Fig. 3 is a front elevation to an enlarged scale of a front supporting roller and a bracket carrying such roller, and Fig. 4 is a side elevation of the same.

In lawn mowers of the type herein referred to the side driving wheels 1 are mounted to revolve on axles carried by the side frames 2 and are provided with internal toothed wheels which drive the cutter through pinions on a shaft 3 to which the cutter blades 4 are attached. At the front of the lawn mower the side frames are connected together by a tie rod 5 and at the back by the fixed cutter 6. The side frames also carry the handle 7 and the bearings 8 for the back roller 9, the said bearings being adjustably attached to the side frames so that the position of the cutter relatively to the surface of the lawn can be regulated.

According to the present invention the tie rod 5 is fitted with a clip 10 the hole of which is provided with a number of longitudinal grooves 11 Fig. 3 so that the clip can be applied to tie rods of different diameters and form an efficient grip upon such tie rods. The two parts of the clip are fastened together, and to the tie rod by bolts 12 and the under portion of the clip is made with a tail piece 13 which is preferably square or rectangular in section. Adjustably mounted on the tail piece 13 is a forked bracket 14 carrying an axle 15 for the roller 16 and provided with a set screw 18 by which the bracket is fixed to the tail piece 13.

The clip 10 is fixed upon the tie rod 5 in approximately the position shown in Fig. 1 and the roller is adjusted to rest upon the lawn when the cutter shaft is horizontal, and so that when one of the side rollers 1 overhangs the edge of the lawn 17 Fig. 1 the cutter is held in its horizontal position by the back roller 9, the side roller 1 that is on the lawn and the front supporting roller 16.

The shape and size of the clip and the bracket for the roller may be varied according to the requirements of the lawn mower and in particular to the position of the front tie rod, and in lawn mowers in which the tie rod is very close to the revolving cutter an additional tie rod may be inserted for carrying the front supporting roller.

I claim:—

1. In a lawn mower having side frames and a cross connecting bar between the side frames, a roller supported by the said cross bar and located between the said frames, the roller being adjustable along the bar by which it is supported.

2. In a lawn mower the combination of the side driving wheels with a revolving cutter, a fixed cutter, an adjustable back roller, the side frames, a tie rod between such frames, a clip attached to the said tie rod, a forked bracket adjustably fixed to the tail piece of the clip and a roller carried by such bracket as herein set forth.

3. The combination with lawn mowers of the type herein referred to of a front supporting roller, a bracket carrying such roller, a clip with a tail piece to which the said bracket is attached and longitudinal grooves in the said clip as herein set forth.

GEORGE SLATTER.

Witnesses:
WILLIAM H. POTTER,
HARRY ROPER.